(12) United States Patent
Attar et al.

(10) Patent No.: US 7,848,298 B2
(45) Date of Patent: Dec. 7, 2010

(54) DE-COUPLING FORWARD AND REVERSE LINK ASSIGNMENT FOR MULTI-CARRIER WIRELESS COMMUNICATION SYSTEMS

(75) Inventors: Rashid A. Attar, San Diego, CA (US); Peter J. Black, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 445 days.

(21) Appl. No.: 11/190,107

(22) Filed: Jul. 25, 2005

(65) Prior Publication Data

US 2006/0203779 A1    Sep. 14, 2006

Related U.S. Application Data

(60) Provisional application No. 60/659,955, filed on Mar. 8, 2005.

(51) Int. Cl.
*H04B 7/216* (2006.01)

(52) U.S. Cl. .................... 370/335; 370/342; 370/395.4; 455/69; 455/522; 455/450

(58) Field of Classification Search ................ 370/335, 370/336, 337, 329, 330, 331, 352, 441, 442, 370/443, 342, 350, 395.4; 455/436, 437, 455/438, 439, 450–452.2, 453, 464, 69–70, 455/522, 509
See application file for complete search history.

(56) References Cited

U.S. PATENT DOCUMENTS

| | | | | |
|---|---|---|---|---|
| 4,423,413 A | * | 12/1983 | da Silva | 370/343 |
| 5,461,639 A | * | 10/1995 | Wheatley et al. | 370/342 |
| 5,603,096 A | * | 2/1997 | Gilhousen et al. | 455/69 |
| 5,621,723 A | * | 4/1997 | Walton et al. | 370/335 |
| 5,745,520 A | * | 4/1998 | Love et al. | 375/130 |
| 5,878,036 A | * | 3/1999 | Spartz et al. | 370/335 |
| 5,881,368 A | * | 3/1999 | Grob et al. | 455/69 |
| 5,914,950 A | * | 6/1999 | Tiedemann et al. | 370/348 |
| 5,923,650 A | * | 7/1999 | Chen et al. | 370/331 |
| 5,940,743 A | * | 8/1999 | Sunay et al. | 455/69 |
| 6,034,952 A | * | 3/2000 | Dohi et al. | 370/335 |

(Continued)

FOREIGN PATENT DOCUMENTS

WO    WO9639748 A1    12/1996

(Continued)

OTHER PUBLICATIONS

PCT Search Report (6 pgs.).

(Continued)

*Primary Examiner*—Sharad Rampuria
(74) *Attorney, Agent, or Firm*—Darren M. Simon (57) ABSTRACT

A method and system for de-coupling forward and reverse link assignment for multi-carrier wireless communication systems. A method may assign two or more forward link code division multiple access (CDMA) carriers to transmit data from a base station to an access terminal; assign one or more reverse link CDMA carriers to transmit data from the access terminal to the base station; and limit reverse link overhead transmissions corresponding to the two or more forward link CDMA carriers.

33 Claims, 10 Drawing Sheets

U.S. PATENT DOCUMENTS

| | | | |
|---|---|---|---|
| 6,049,535 A * | 4/2000 | Ozukturk et al. | 370/335 |
| 6,151,508 A * | 11/2000 | Kim et al. | 455/522 |
| 6,334,047 B1 * | 12/2001 | Andersson et al. | 455/69 |
| 6,337,987 B1 * | 1/2002 | Agin et al. | 455/522 |
| 6,741,862 B2 * | 5/2004 | Chung et al. | 455/452.1 |
| 6,810,030 B1 * | 10/2004 | Kuo | 370/335 |
| 7,139,274 B2 * | 11/2006 | Attar et al. | 370/395.4 |
| 7,554,946 B2 * | 6/2009 | Conyers et al. | 370/329 |
| 2001/0012785 A1 * | 8/2001 | Esteves et al. | 455/522 |
| 2002/0021692 A1 * | 2/2002 | Huh et al. | 370/352 |
| 2003/0123410 A1 * | 7/2003 | Youm | 370/335 |
| 2004/0038697 A1 * | 2/2004 | Attar et al. | 455/522 |
| 2004/0160922 A1 * | 8/2004 | Nanda et al. | 370/335 |
| 2004/0192315 A1 * | 9/2004 | Li et al. | 455/447 |
| 2004/0264420 A1 * | 12/2004 | Qian et al. | 370/335 |
| 2005/0030964 A1 | 2/2005 | Tiedemann, Jr. et al. | 370/431 |
| 2005/0041618 A1 | 2/2005 | Wei et al. | 370/328 |
| 2007/0211658 A1 * | 9/2007 | Gorokhov et al. | 370/329 |

FOREIGN PATENT DOCUMENTS

| | | |
|---|---|---|
| WO | WO9949595 A1 | 9/1999 |
| WO | WO 01/15481 | 3/2001 |

OTHER PUBLICATIONS

3GPP2: "cdma2000 High Rate Packet Data Air Interface Specification," 3GPP2 C.S0024, Version 4.0, pp. 1-548 (Oct. 2002).

TIA/EIA Interim Standard: "Mobile Station-Base Station Compatibility Standard for Dual-Mode Wideband Spread Spectrum Cellular System," TIA/EIA/IS-95-A (Revision of TIA/EIA/IS-95), pp. 1-744 (May 1995).

International Preliminary Report on Patentability, PCT/US2006/008223—International Searching Authority—The International Bureau of WIPO—Geneva, Switzerland, Sep. 12, 2007.

Written Opinion, PCT/US2006/008223—International Search Authority—European Patent Office, Jul. 19, 2006.

* cited by examiner

FIG. 10A TRANSMIT PROCESSING 1000

FIG. 10B RECEIVE PROCESSING 1001

DE-COUPLING FORWARD AND REVERSE LINK ASSIGNMENT FOR MULTI-CARRIER WIRELESS COMMUNICATION SYSTEMS

CLAIM OF PRIORITY UNDER 35 U.S.C. §119

The present application claims priority to co-assigned U.S. Provisional Application No. 60/659,955, entitled "De-Coupling Forward and Reverse Link Assignment for Multi-Carrier Wireless Communication Systems," filed on Mar. 8, 2005, which is incorporated by reference.

BACKGROUND

1. Field

The present invention relates to wireless communication systems generally, and specifically to methods and apparatus for de-coupling forward and reverse link assignment in multi-carrier wireless communication systems.

2. Background

A communication system may provide communication between a number of base stations and access terminals. Forward link or downlink refers to transmission from a base station to an access terminal. Reverse link or uplink refers to transmission from an access terminal to a base station. Each access terminal may communicate with one or more base stations on the forward and reverse links at a given moment, depending on whether the access terminal is active and whether the access terminal is in soft handoff.

BRIEF DESCRIPTION OF DRAWINGS

The features, nature, and advantages of the present application may be more apparent from the detailed description set forth below with the drawings. Like reference numerals and characters may identify the same or similar objects.

DETAILED DESCRIPTION

Any embodiment described herein is not necessarily preferable or advantageous over other embodiments. While various aspects of the present disclosure are presented in drawings, the drawings are not necessarily drawn to scale or drawn to be all-inclusive.

Figure 1:
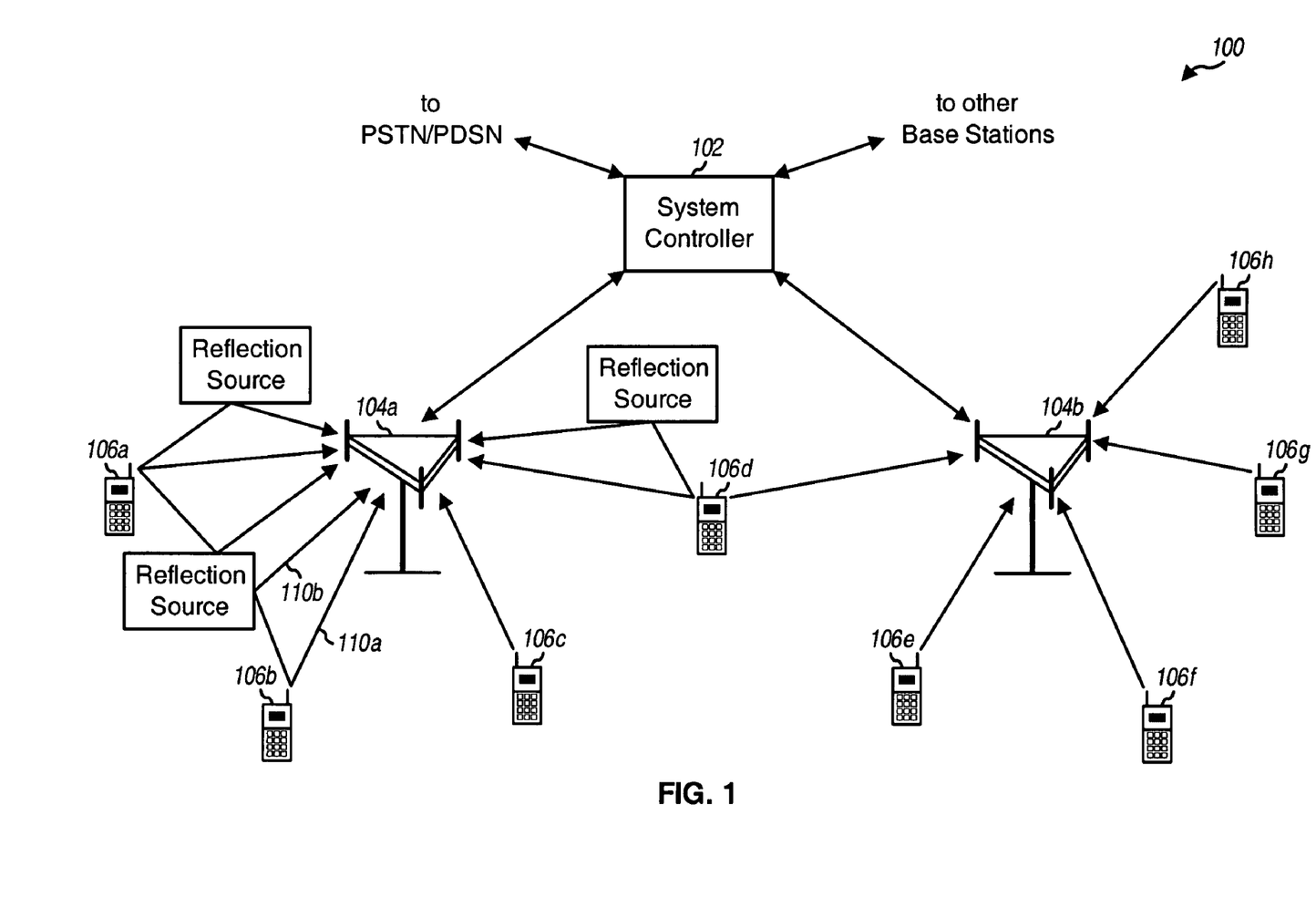
FIG. 1 illustrates a wireless communication system with base stations and access terminals.

FIG. 1 illustrates a wireless communication system 100, which includes a system controller 102, base stations 104a-104b, and a plurality of access terminals 106a-106h. The system 100 may have any number of controllers 102, base stations 104 and access terminals 106. Various aspects and embodiments of the present disclosure described below may be implemented in the system 100.

Access terminals 106 may be mobile or stationary and may be dispersed throughout the communication system 100 of FIG. 1. An access terminal 106 may be connected to or implemented in a computing device, such as a laptop personal computer. Alternatively, an access terminal may be a self-contained data device, such as a personal digital assistant. An access terminal 106 may refer to various types of devices, such as a wired phone, a wireless phone, a cellular phone, a lap top computer, a wireless communication personal computer (PC) card, a personal digital assistant (PDA), an external or internal modem, etc. An access terminal may be any device that provides data connectivity to a user by communicating through a wireless channel or through a wired channel, for example using fiber optic or coaxial cables. An access terminal may have various names, such as mobile station, access unit, subscriber unit, mobile device, mobile terminal, mobile unit, mobile phone, mobile, remote station, remote terminal, remote unit, user device, user equipment, handheld device, etc.

The system 100 provides communication for a number of cells, where each cell is serviced by one or more base stations 104. A base station 104 may also be referred to as a base station transceiver system (BTS), an access point, a part of an access network, a modem pool transceiver (MPT), or a Node B. Access network refers to network equipment providing data connectivity between a packet switched data network (e.g., the Internet) and the access terminals 106.

Forward link (FL) or downlink refers to transmission from a base station 104 to an access terminal 106. Reverse link (RL) or uplink refers to transmission from an access terminal 106 to a base station 104.

A base station 104 may transmit data to an access terminal 106 using a data rate selected from a set of different data rates. An access terminal 106 may measure a signal-to-noise-and-interference ratio (SINR) of a pilot signal sent by the base station 104 and determine a desired data rate for the base station 104 to transmit data to the access terminal 106. The access terminal 106 may send data request channel or data rate control (DRC) messages to the base station 104 to inform the base station 104 of the desired data rate.

The system controller 102 (also referred to as a base station controller (BSC)) may provide coordination and control for base stations 104, and may further control routing of calls to access terminals 106 via the base stations 104. The system controller 102 may be further coupled to a public switched telephone network (PSTN) via a mobile switching center (MSC), and to a packet data network via a packet data serving node (PDSN).

The communication system 100 may use one or more communication techniques, such as code division multiple access (CDMA), IS-95, high rate packet data (HRPD), also referred to as high data rate (HDR), as specified in "cdma2000 High Rate Packet Data Air Interface Specification," TIA/EIA/IS-856, CDMA 1× evolution data optimized (EV-DO), 1×EV-DV, wideband CDMA (WCDMA), universal mobile telecommunications system (UMTS), time division synchronous CDMA (TD-SCDMA), orthogonal frequency division multiplexing (OFDM), etc. The examples described below provide details for clarity of understanding. The ideas presented herein are applicable to other systems as well, and the present examples are not meant to limit the present application.

Multi-Carrier System

A "multi-carrier" system described herein may use frequency division multiplex, wherein each "carrier" corresponds to a radio frequency range. For example, a carrier may be 1.25 Megahertz wide, but other carrier sizes may be used. A carrier may also be called a CDMA carrier, a link or a CDMA channel.

Data flow requirements may be biased towards heavier usage of a forward or reverse link. The description below relates to de-coupling forward link and reverse link assignment in a multi-carrier wireless communication system. The system 100 may assign M forward links (or carriers) and N reverse links (or carriers) to an access terminal 106, where M and N may not be equal. The description below describes mechanisms for overhead channel transmissions to reduce reverse link overhead.

The base stations, BSCs or MSC may determine a number of FL carriers assigned for an access terminal. The base stations, BSCs or MSC may also change the number of FL carriers assigned for an access terminal depending on conditions, such as channel conditions, available data for the terminal, terminal power amplifier headroom, and application flows.

The access terminals 106 may run applications, such as Internet applications, video conferencing, movies, games, etc., which may use voice, image files, video clips, data files, etc., transmitted from the base stations 104. The applications may include two types:

1. Delay-tolerant, high forward link throughput and low reverse link throughput; and
2. Delay-sensitive, low forward link throughput and low reverse link throughput. Other types of applications may also exist.

If the system 100 uses multiple carriers on the forward link to achieve high throughput or maximize spectral efficiency, an access terminal 106 may avoid transmission on all associated carriers on the reverse link to improve reverse link efficiency.

For type 1 applications where a slower DRC update is acceptable, an access terminal 106 may:
a) transmit a continuous pilot signal on a primary reverse link carrier;
b) transmit data only on the primary reverse link carrier;
c) transmit DRC for each FL carrier as time-division multiplexed on the primary reverse link carrier, which assumes slower DRC channel update is acceptable; and
d) transmit acknowledgment (ACK) or negative acknowledgment (NAK) messages for each FL carrier as needed. An access terminal 106 can transmit a gated pilot (at the same power level as the pilot on the primary RL carrier) on secondary carriers when transmitting ACK channel, e.g., ½ slot skirt around ACK transmission for pilot filter warm-up.

For type 1 applications where a slower DRC update may not be not acceptable, an access terminal 106 may:
a) transmit a continuous pilot signal on all reverse link carrier(s) associated with enabled forward link carriers;
b) transmit data only on the primary reverse link carrier; and
c) transmit ACK for each FL carrier as needed.

For type 2 applications, an access terminal 106 may:
a) transmit a continuous pilot on the primary reverse link carrier;
b) transmit data only on the primary reverse link carrier;
c) transmit DRC for each FL carrier as time-division multiplexed on the primary reverse link carrier, which assumes slower DRC channel update is acceptable; and
d) transmit ACK only on the primary reverse link carrier. A base station 104 may be constrained to ensure no more than one packet is in flight across all forward link carriers. A base station 104 can determine ACK association based on timing of transmitted FL packet.

Figure 11:
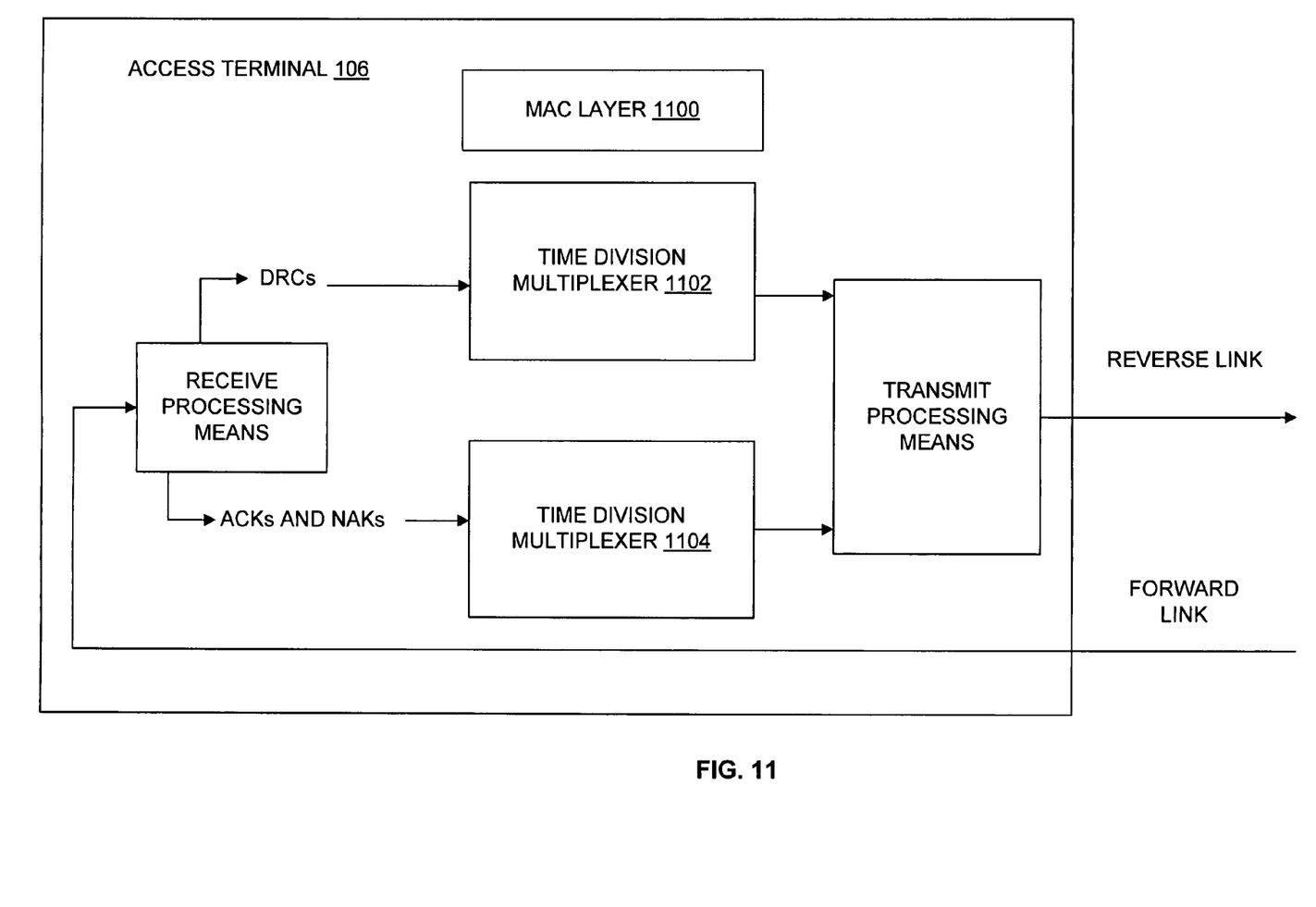
FIG. 11 illustrates some components of an access terminal of FIG. 1.

Alternatively, an access terminal 106 may perform an alternate form of ACK channel transmission:
a) Reduce ACK channel transmit time interval if desired, e.g., if the system 100 supports additional FL carriers (in an EV-DO system, ACK may be transmitted in ½ slot);
b) ACK channel transmission for N forward link carriers within a single ½ slot;
c) ACK channel transmit interval is a function of number of enabled forward link carriers; and
d) ACK channel transmissions on RL and FL association setup may be implemented via signaling in the medium access control (MAC) layer 1100 (FIG. 11).

Multi-Carrier Forward Traffic Channel MAC

There may be two modes of carrier assignment: symmetric carrier assignment and asymmetric carrier assignment.

Figure 2:
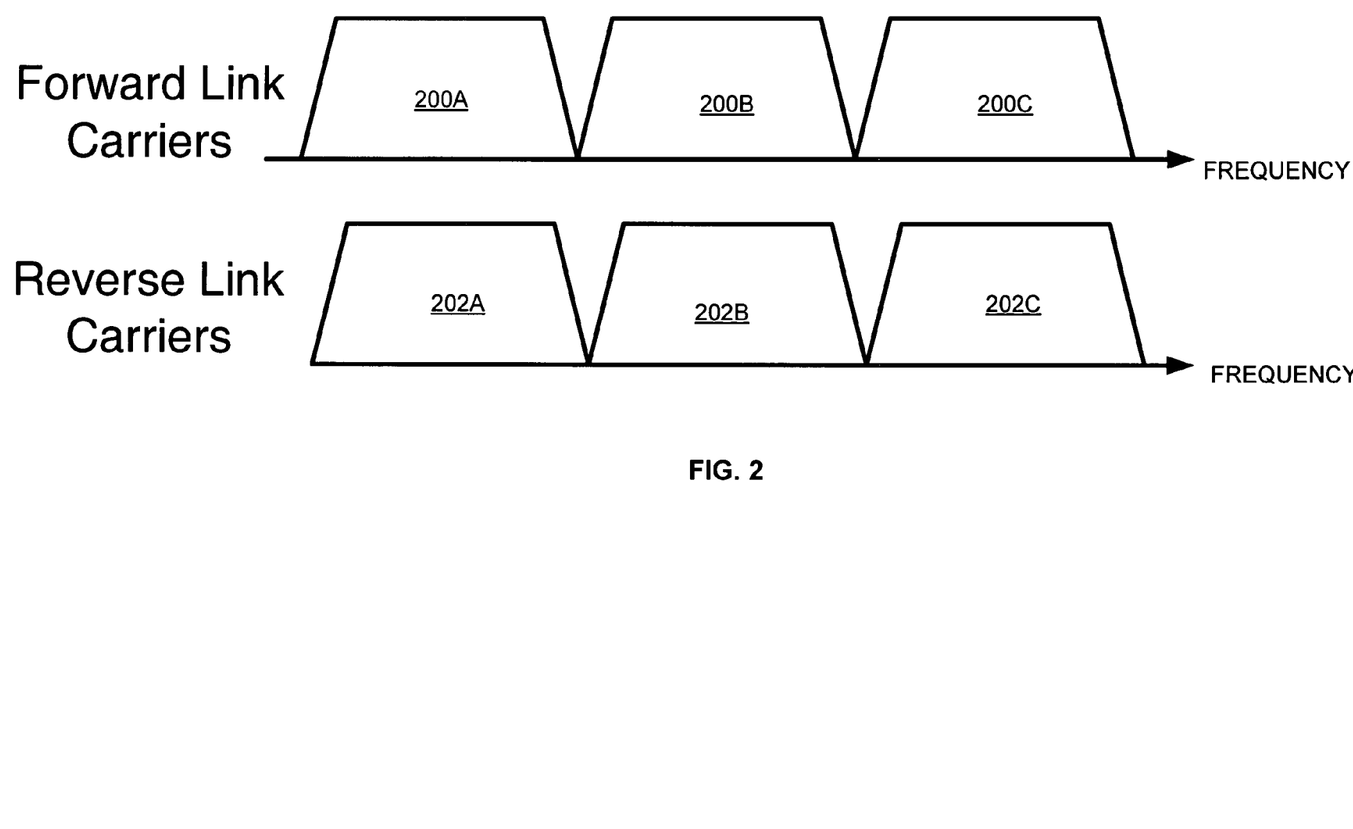
FIG. 2 illustrates an example of symmetric forward link and reverse link carrier assignment.

FIG. 2 illustrates an example of symmetric carrier assignment with three forward link carriers 200A-200C, e.g., used for EV-DO data, and three corresponding reverse link carriers 202A-202C. Symmetric carrier assignment may be used for (a) applications with symmetric data rate requirements, and/or (b) applications with asymmetric data rate requirements supported on hardware that enforces symmetric FL/RL operation.

Figure 3A:
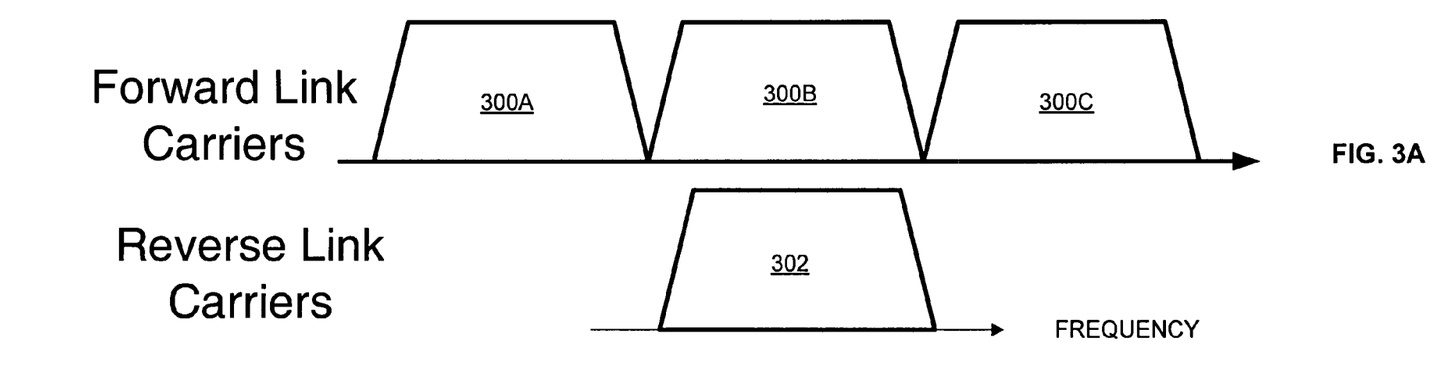
FIGS. 3A and 3B illustrate examples of asymmetric carrier assignment.
Figure 3B:
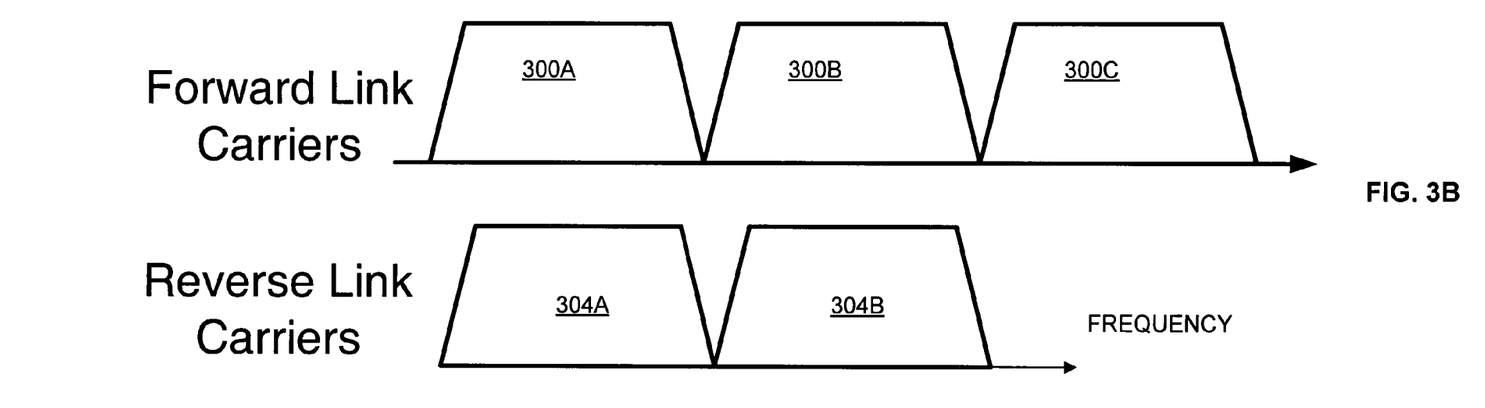

FIGS. 3A and 3B illustrate examples of asymmetric carrier assignment. FIG. 3A shows three forward link carriers 300A-300C and one corresponding reverse link carrier 302. FIG. 3B shows three forward link carriers 300A-300C, and two corresponding reverse link carriers 304A, 304B. Asymmetric carrier assignment may be used for applications with asymmetric data rate requirements, such as file transfer protocol (FTP) download. Asymmetric carrier assignment may have (a) reduced reverse link overhead and (b) MAC channels that allow forward link traffic (FLT) carrier assignment to be separate from reverse power control (RPC) carrier assignment.

Asymmetric Forward and Reverse Link Assignment—Multi-Carrier DRC

An access terminal 106 may time-division multiplex DRC channel transmission for multiple forward link carriers on a single reverse link carrier.

FIG. 11 illustrates a time division multiplexer 1102 for multiplexing DCR information in an access terminal 106 of FIG. 1.

A MAC layer 1100 (FIG. 11) in the access terminal 106 may provide DRC-to-forward-link association based on DRC transmit time. The number of forward link carriers (for which DRC transmissions are indicated by a single reverse link carrier) may depend on: (i) a maximum acceptable DRC span, which is a time interval required for transmission of DRC for all assigned forward link carriers, e.g., DRC span=max (16 slots, DRCLength (per carrier)×number of carriers); and (ii) number of carriers supported by hardware, such as a 1×EV-DO Rev A channel card. In one embodiment, four FL carriers are associated with a single RL carrier, which may be limited by sending ACKs for the four FL carriers.

In another embodiment, an access terminal 106 may use a single DRC channel across all carriers. In other words, an access terminal 106 sends a single DRC to a base station 104 for all designated FL carriers to transmit data at the DRC-designated rate to that access terminal 106.

In another embodiment, an access terminal 106 may use a combination of (a) a single DRC channel across multiple carriers (same DRC for some FL carriers of the total number of FL carriers) and (b) time-division multiplexed DRC channel.

Figures 4A, 4B:
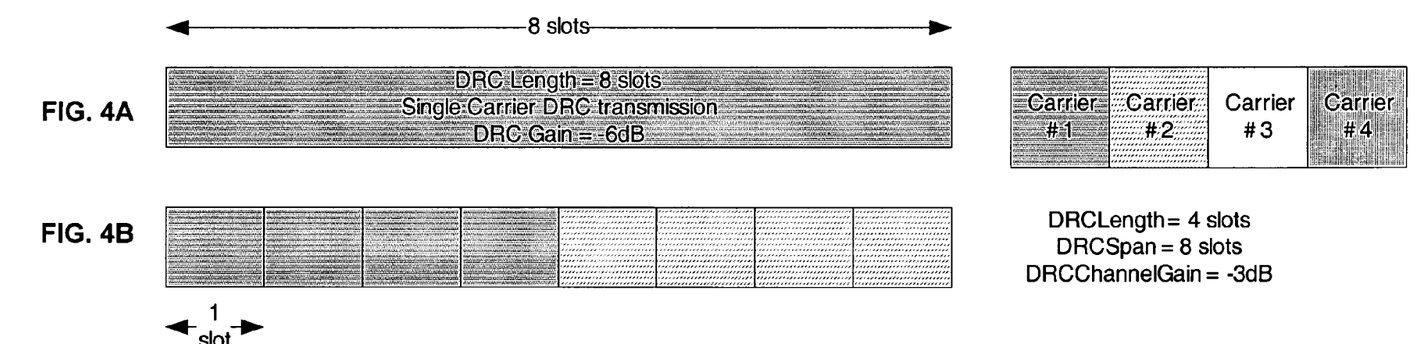
FIG. 4A illustrates an example of a data rate control (DRC) reverse link transmission for a single forward link carrier.
FIGS. 4B-4F illustrate examples of multi-carrier, time division multiplexed DRC.
Figure 4A:
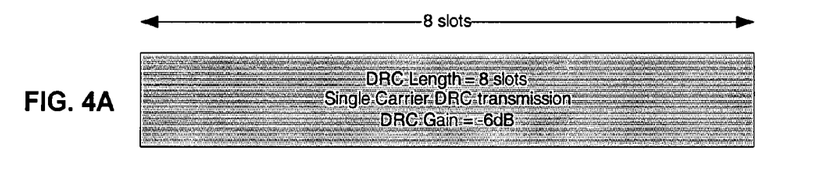
Figure 4C:
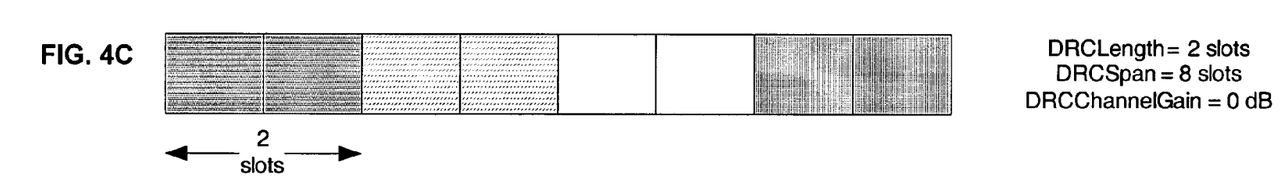

FIG. 4A illustrates an example of a DRC reverse link transmission (DRC length =8 slots), which requests a data transmit rate for a single forward link carrier to use. FIGS. 4B-4F illustrate examples of multi-carrier, time division multiplexed DRC. Specifically, FIG. 4B shows an example of two DRCs (DRC length=4 slots each; DRC span=8 slots) transmitted on a single reverse link carrier for two forward link carriers. FIG. 4C shows an example of four DRCs (DRC length=2 slots each; DRC span=8 slots) transmitted on a single reverse link carrier for four forward link carriers.

Figure 4D:
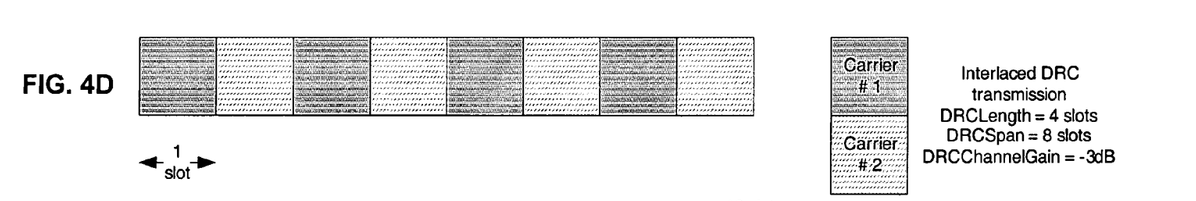
Figure 4E:
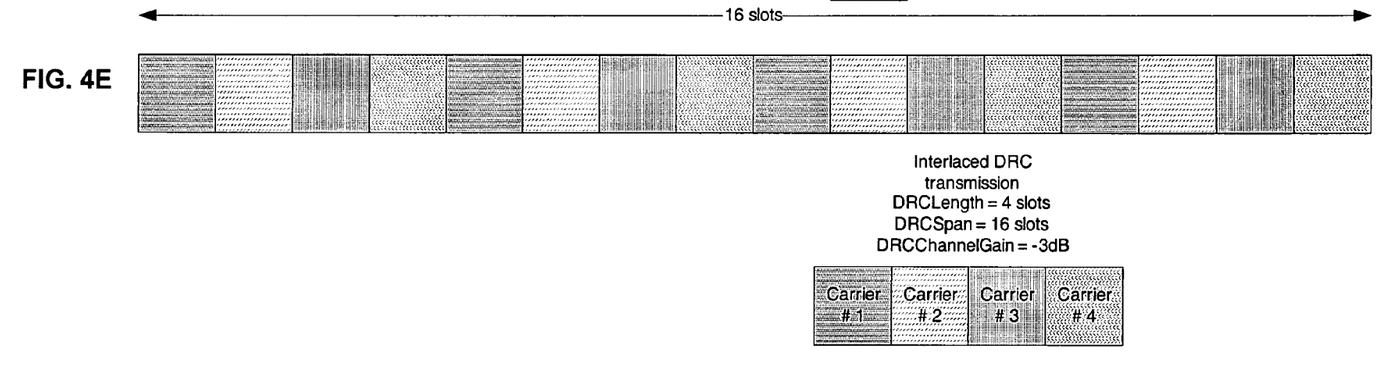
Figure 4F:
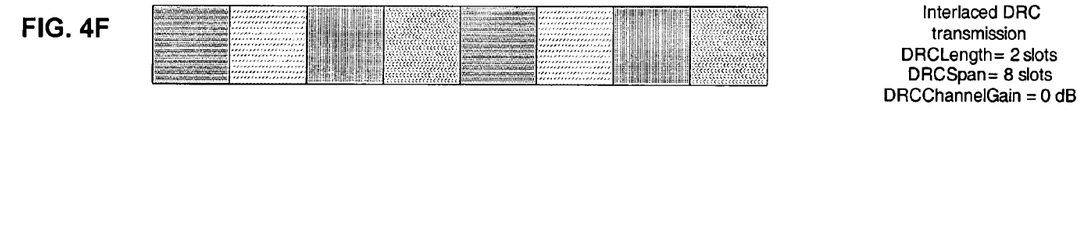

FIG. 4D illustrates an example of two interlaced DRCs (DRC length=4 slots each; DRC span=8 slots) transmitted on a single reverse link carrier for two forward link carriers. Interlaced DRC channel transmission may provide additional time diversity for a given DRCLength. FIG. 4E shows an example of four interlaced DRCs (DRC length=4 slots each; DRC span=16 slots) transmitted on a single reverse link carrier for four forward link carriers. FIG. 4F shows an example of four interlaced DRCs (DRC length=2 slots each; DRC span=8 slots) transmitted on a single reverse link carrier for four forward link carriers.

Asymmetric Forward and Reverse Link Assignment—Multi-Carrier ACK

An access terminal 106 may time division multiplex ACK channel transmission for multiple forward link carriers on a single reverse link carrier, as explained below with FIG. 5E. FIG. 11 illustrates a time division multiplexer 1104 for multiplexing ACK information in an access terminal 106 of FIG. 1.

Per carrier ACK channel transmission may be reduced, for example, from 1 slot to ¼ slot (each ACK transmitted for ¼ slot) (instead of ½ slot used in EV-DO Rev A), which may depend on a number of FL carriers for which ACK channel is transmitted. The MAC layer 1100 (FIG. 11) at the access terminal 106 may provide ACK-to-forward-link association based on ACK transmit time.

Figures 5A, 5B, 5C:
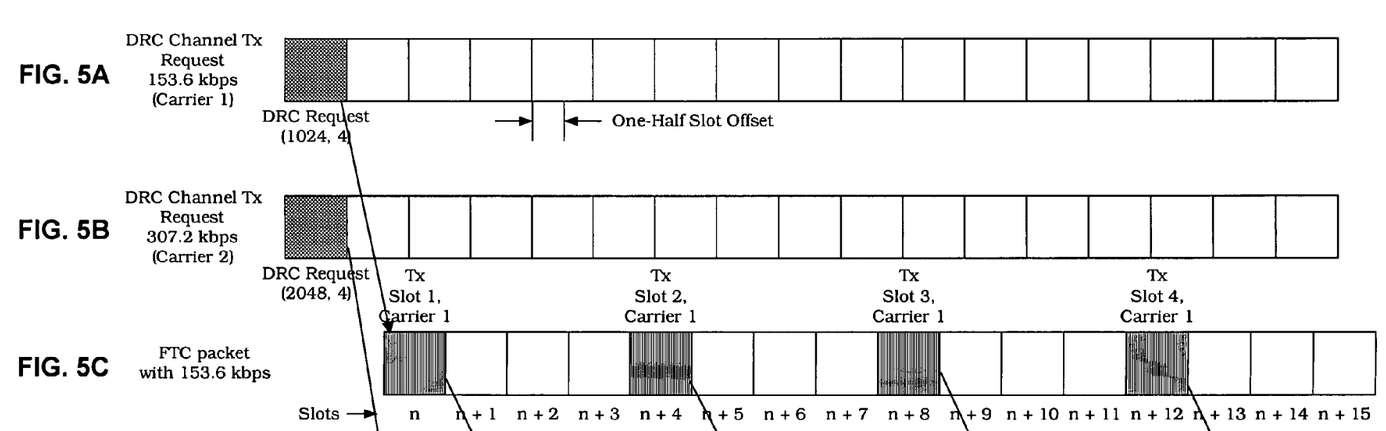
FIGS. 5A-5B illustrate an example of an access terminal sending two DRC channel transmit requests to a base station for two forward link carriers to transmit data at two different rates.
FIGS. 5C-5D illustrate a base station transmitting forward traffic channel sub-packets on two forward link carriers at two different rates.

FIGS. 5A-5B show an example of two DRC channel transmit requests sent from an access terminal 106 to a base station 104 for two forward link carriers (carriers 1 and 2) to transmit FL data at two different rates (e.g., 153.6 and 307.2 kbps). FIGS. 5A-5B may show the DRCs decoded by the base station 104, but FIGS. 5A-5B do not indicate the method with which the DRCs are time division multiplexed on a single Reverse Link carrier, as in FIGS. 4B-4F.

Figure 5D:
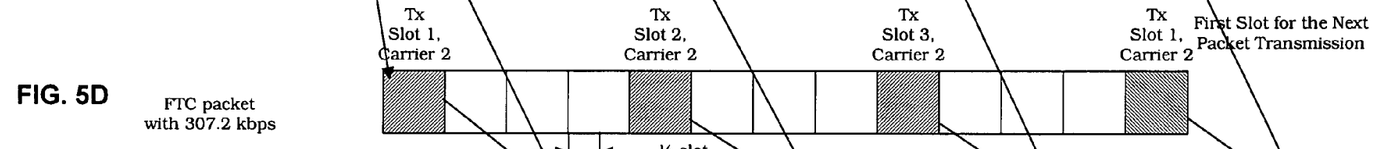

In response to the DRCs, the base station 104 transmits forward traffic channel (FTC) sub-packets on the two forward link carriers at the two different rates (e.g., 153.6 and 307.2 kbps) in FIGS. 5C-5D.

The base station 104 may repeat and process data bits of an original data packet into a plurality of corresponding "sub-packets" to transmit to the access terminal 106. If the access terminal 106 experiences a high signal-to-noise ratio signal, the first sub-packet may contain sufficient information for the access terminal 106 to decode and derive the original data packet. If the access terminal 106 experiences fading or a low signal-to-noise-ratio signal, the access terminal 106 may have a relatively low probability of correctly decoding and deriving the original data packet from only the first sub-packet.

If the access terminal 106 does not successfully decode the first sub-packet, the access terminal 106 sends a NAK to the base station 104. The base station 104 then sends a second sub-packet. The access terminal 106 may combine information from the first and second sub-packets to try to decode the original data packet. As the access terminal 106 receives more sub-packets and combines information derived from each received sub-packet, the probability of decoding and deriving the original data packet increases.

In FIG. 5C, a base station 104 sends a first sub-packet of an original data packet to the access terminal 106 in slot 1 of carrier 1. Simultaneously, in FIG. 5D, the base station 104 sends a first sub-packet of another original data packet to the access terminal 106 in slot 1 of carrier 2.

The access terminal 106 tries to decode the two original data packets from the received first sub-packets on carriers 1 and 2, respectively. The access terminal 106 cannot correctly decode the received first sub-packet on carrier 1; sends a NAK on the ACK channel to the base station 104 in FIG. 5E; cannot correctly decode a received second sub-packet on carrier 1; sends a NAK on the ACK channel to the base station 104; cannot correctly decode a received third sub-packet on carrier 1; sends a NAK on the ACK channel to the base station 104; correctly decodes a received fourth sub-packet on carrier 1; and sends an ACK on the ACK channel to the base station 104.

Figure 5E:
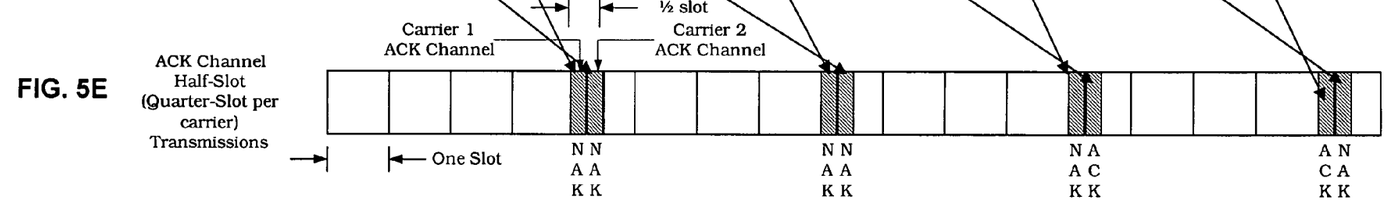
FIG. 5E illustrates an access terminal sending acknowledgements (ACK) and negative acknowledgements (NAK) on a single reverse link channel for the two forward link carriers.

Also in FIG. 5E, the access terminal 106 cannot correctly decode the first and second received sub-packets on carrier 2 and sends NAKs to the base station 104. The access terminal 106 correctly decodes the original second packet (e.g., using a cyclic redundancy check (CRC) or other error detection technique) after receiving and processing the third sub-packet on slot 3 of carrier 2. The access terminal 106 sends an acknowledgement (ACK) signal to the base station 104 to not send a fourth sub-packet for the second original packet on carrier 2.

The base station 104 can then send a first sub-packet of a next packet in slot 1 (n +12) of carrier 2. In FIG. 5E, the access terminal 106 sends ACKs and NAKs on a single ACK/NAK RL channel for the two FL carriers (½ slot ACK/NAK channel transmissions with a ¼ slot per FL carrier).

In another embodiment of a multi-carrier ACK, an access terminal 106 may use a single RL ACK channel, where RL ACK is associated with FL based on timing of packet reception (also called transmit-time-based-ACK-channel association). This may be used for Voice over Internet Protocol (VoIP)-type traffic. Transmit-time-based-ACK-channel association may add a constraint on a FL scheduler to limit transmission on a single FL carrier to a given access terminal 106 at a time.

Enhanced Multi-Carrier DRC

In another embodiment, an access terminal 106 may implement an enhanced multi-carrier DRC, which may include:

a) Split DRC rate and DRC cover information (FIGS. 7 and 8), i.e., an access terminal 106 may transmit separate DRC rate and DRC cover messages. An access terminal 106 uses a "DRC cover" to specify a sector to transmit data, such as a sector in the access terminal's active set. The access terminal 106 is said to "point" the DRC at that sector. An access terminal 106 may transmit the same DRC cover for all FL carriers. DRC cover length may be equal to DRC rate length. DRC rate length may correspond to DRC rate transmission for all assigned FL carriers.

b) Per carrier bi-orthogonal coding for rate (FIG. 7), i.e., the access terminal 106 may selectively repeat bi-orthogonal coded symbols per FL carrier to achieve a total of 64 binary symbols per slot.

c) A single DRC cover channel (FIG. 8) may be used for an access terminal 106, regardless of the number of FL carriers. The DRC cover channel may include the DRC cover and the number of active FL carriers, e.g., 1 through 16.

d) DRC channel transmissions on RL and FL association may be setup via signaling in the MAC layer 1100 (FIG. 11).

Figure 6:
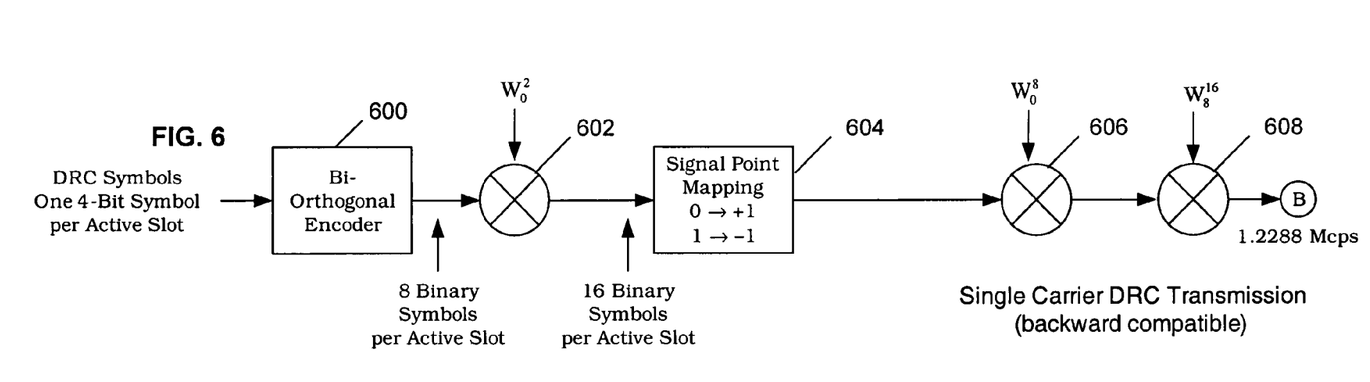
FIG. 6 illustrates a process and structure for preparing single-carrier DRC messages for transmission.

FIG. 6 illustrates a process and structure for preparing single-carrier DRC messages for transmission. A bi-orthogonal encoder 600 encodes DRC symbols (one 4-bit symbol per active slot) and outputs 8 binary symbols per active slot. A multiplier 602 applies a Walsh covering/code to produce 16 binary symbols per active slot. A signal point mapping block 604 maps 0s and 1s to +1 and −1. Other multipliers 606, 608 may apply additional Walsh coverings/codes.

Figure 7:
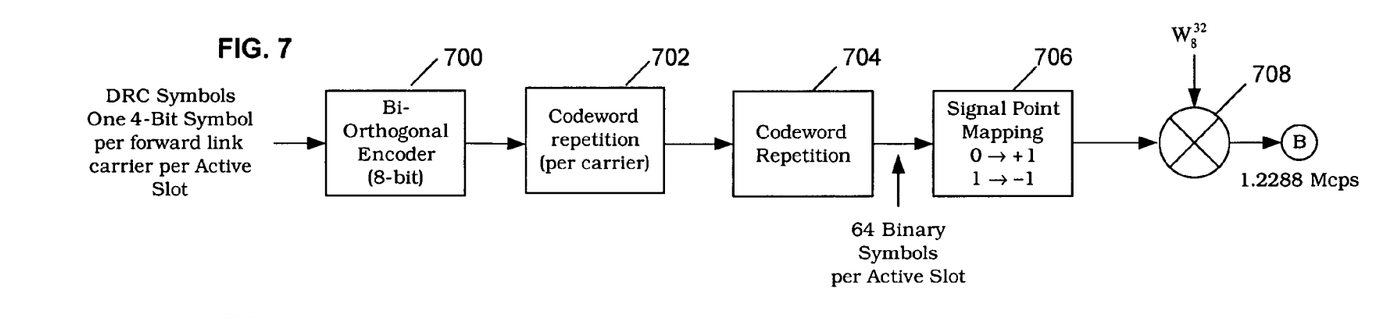
FIGS. 7 and 8 illustrate processes and structures for separate multi-carrier DRC rate and cover transmission.
Figure 8:
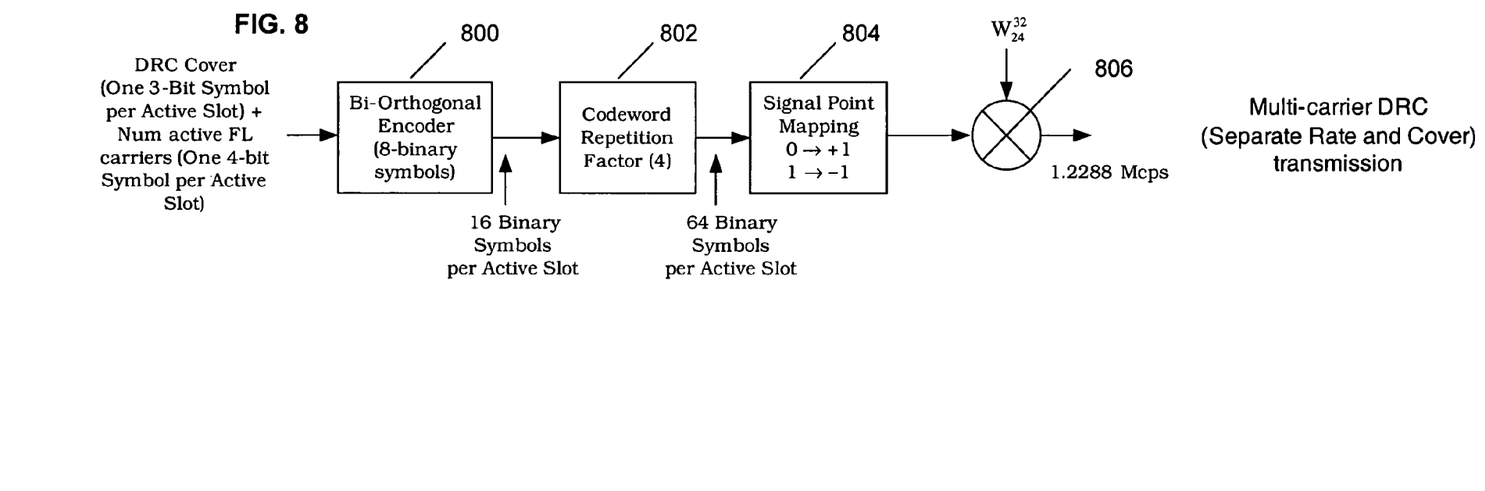

FIGS. 7 and 8 illustrate processes and structures for separate multi-carrier DRC rate and cover transmission. Specifically, FIG. 7 shows a process and structure for preparing multi-carrier DRC rate information for transmission. A bi-orthogonal encoder 700 encodes DRC symbols (one 4-bit symbol per forward link carrier per active slot). A codeword repetition or repeater block 702 may repeat codewords per carrier. Another codeword repetition block 704 may repeat codewords to produce 64 binary symbols per active slot. A signal point mapping block 706 maps 0s and 1s to +1 and −1. A multiplier 708 applies a Walsh covering/code to indicate a DRC rate channel.

FIG. 8 shows a process and structure for preparing enhanced multi-carrier DRC cover information for transmission. A bi-orthogonal encoder 800 encodes DRC cover information (e.g., one 3-bit symbol per active slot) and the number of active FL carriers (e.g., one 4-bit symbol per active slot) and produces 16 binary symbols per active slot. A codeword repetition or repeater block 802 may repeat codewords with a factor of four to produce 64 binary symbols per active slot. A signal point mapping block 804 maps 0s and 1s to +1 and −1. A multiplier 806 applies a Walsh covering/code to indicate a DRC cover channel.

Multi-Carrier Reverse Link Walsh Channel Usage

Appendix A shows examples of DRC cover channel and DRC rate channel formats, which may be implemented by the processes and structures in FIGS. 7 and 8 for enhanced multi-carrier DRC. Other DRC cover channel and DRC rate channel formats may be implemented instead of or in addition to the formats shown in Appendix A.

Enhanced Multi-Carrier ACK

An access terminal 106 may use an enhanced multi-carrier ACK by:

a) Transmitting ACK over a ½ slot or 1 slot, depending on a number of FL carriers for which the ACK channel is transmitted.

b) Transmitting ACK channel for first 4-carriers using I/Q phases (in-phase (I), quadrature (Q)) of Walsh code W(32, 12) and I/Q-phases of W(32,20). If additional ACK channel transmissions are required for additional FL carriers, the access terminal 106 can use ½ slot ACK on each of the phases of W(32,12) and W(32,20). Thus, the access terminal 106 may support ACKs for up to 8 FL carriers with a single RL carrier.

c) ACK channel transmissions on RL and FL association may be setup via signaling in the MAC layer 1100 (FIG. 11).

Figure 9:
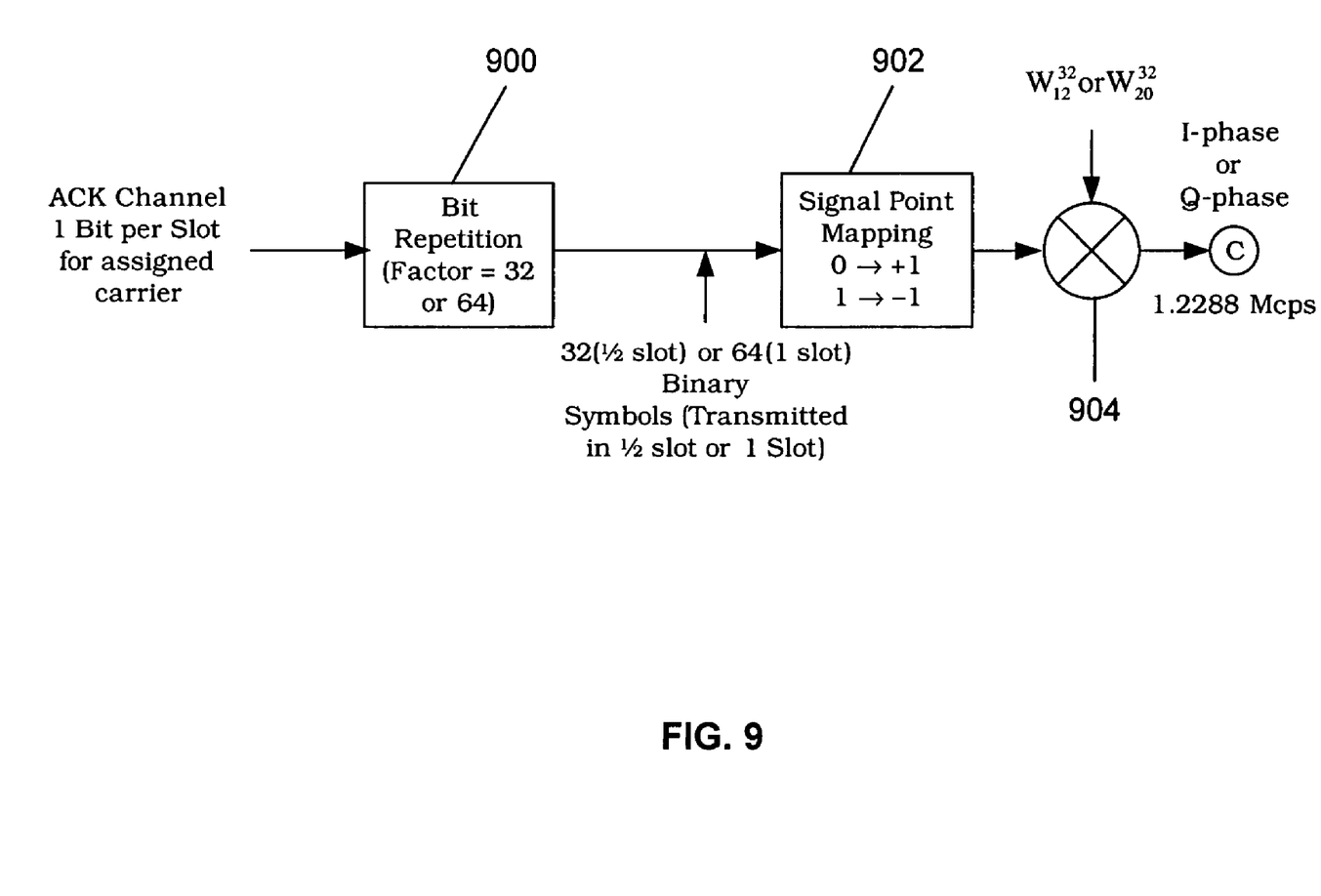
FIG. 9 illustrates a structure and process for preparing ACK channel transmissions.

FIG. 9 illustrates a structure and process for preparing multi-carrier ACK channel transmissions. A bit repetition block or repeater 900 receives ACK channel bits (1 bit per slot for assigned carrier) and may repeat bits at a factor of 32 or 64 to produce 32 (½ slot) or 64 (1 slot) binary symbols (transmitted in ½ slot or 1 slot). A signal point mapping block 902 maps 0s and 1s to +1 and −1. A multiplier 904 applies a Walsh covering/code (I-phase or Q-phase) to indicate an ACK/NAK channel.

Multi-Carrier DSC Channel Transmission

An access terminal 106 may transmit multi-carrier Data Source Channel (DSC) on a single/primary RL carrier. The access terminal 106 may use MAC layer assignment of the carrier.

Forward Link Soft-Combining Mode

An access terminal 106 may use multi-carrier DRC with a forward link soft-combining mode (soft-combining data received across multiple FL carriers). In this mode, the base station 104 does not have to transmit the packets on the individual forward links at the same time, i.e., the design would support soft handoff across carriers with asynchronous transmissions. An access terminal 106 may indicate a DRC index based on transmission to the access terminal 106 in a given slot on multiple FL carriers by the same base station 104.

In one embodiment, the system or network 100 may use general attribute update protocol (GAUP) to indicate that all packet transmissions to a given terminal 106 will be multi-carrier transmissions for some length of time. The access terminal 106 may, until instructed otherwise, transmit a DRC based on a combined SINR prediction. The MAC layer 1100 (FIG. 11) may provide signal mapping.

The network may have some flexibility to serve the access terminal 106 using one carrier or a combination of carriers in that same time interval. This may use individual DRCs per carrier as well as DRCs based on a combined SINR prediction. The network may configure the access terminal 106 to operate in one of these two modes of DRC reporting. The forward link soft-combining mode may be used, for example, when the access terminal 106 experiences poor channel conditions for VoIP flows or for all types of flows.

Number of MAC Indices

The system 100 may use additional MAC indices for preamble transmission to access terminals 106 assigned with multiple FL carriers. A total number of MAC indices per carrier may be increased to 256 with an 8-bit preamble MAC index and bi-orthogonally coded 128-chip preamble:

$W(128, i/4), 0 \leq i \leq 255$ $W(128, (i-1)/4), 1 \leq i \leq 255$ $W(128, (i-2)/4), 2 \leq i \leq 255$ $W(128, (i-3)/4), 3 \leq i \leq 255$ The system 100 may modify a packet information (PacketInfo) field in a multi-user packet (MUP) header: 1-bit format field +7-bit preamble (MAC) index (e.g., format field indicates Format A or Format B connection layer packet) and 8-bit preamble (MAC) Index.

Figure 10A:
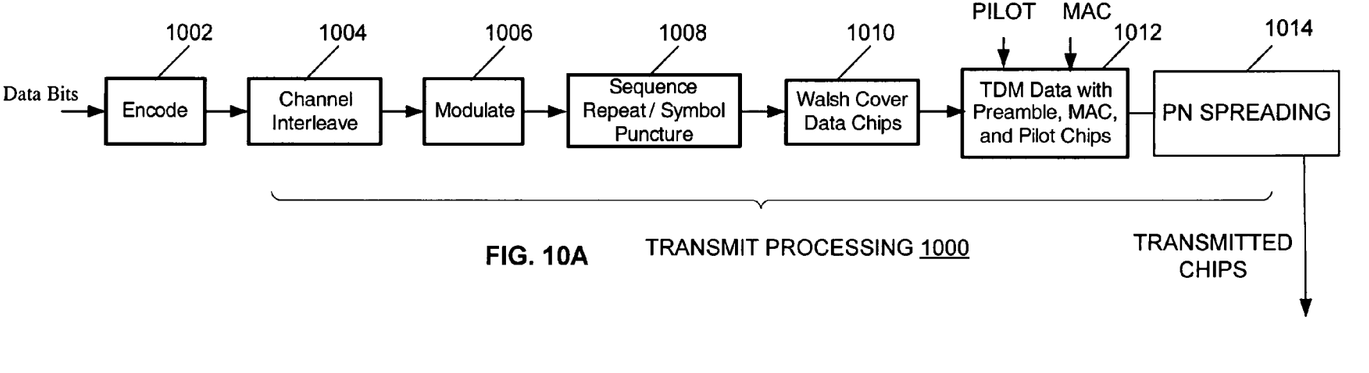
FIG. 10A illustrates an example of a forward link transmit chain, structure or process, which may be implemented at a base station of FIG. 1.

FIG. 10A illustrates an example of a forward link transmit chain, structure or process, which may be implemented at a base station 104 of FIG. 1. The functions and components shown in FIG. 10A may be implemented by software, hardware, or a combination of software and hardware. Other functions may be added to FIG. 10A in addition to or instead of the functions shown in FIG. 10A.

In block 1002, an encoder encodes data bits using one or more coding schemes to provide coded data chips. Each coding scheme may include one or more types of coding, such as cyclic redundancy check (CRC), convolutional coding, Turbo coding, block coding, other types of coding, or no coding at all. Other coding schemes may include Automatic Repeat Request (ARQ), Hybrid ARQ, and incremental redundancy repeat techniques. Different types of data may be coded with different coding schemes.

In block 1004, an interleaver interleaves the coded data bits to combat fading. In block 1006, a modulator modulates coded, interleaved data to generate modulated data. Examples of modulation techniques include binary phase shift keying (BPSK) and quadrature phase shift keying (QPSK).

In block 1008, a repeater may repeat a sequence of modulated data or a symbol puncture unit may puncture bits of a symbol. In block 1010, a spreader (e.g., multiplier) may spread the modulated data with a Walsh cover (i.e., Walsh code) to form data chips.

In block 1012, a multiplexer may time-division multiplex the data chips with pilot chips and MAC chips to form a stream of chips. In block 1014, a pseudo random noise (PN) spreader may spread the stream of chips with one or more PN codes (e.g., short code, long code). The forward link modulated signal (transmitted chips) is then transmitted via an antenna over a wireless communication link to one or more access terminals 106.

Figure 10B:
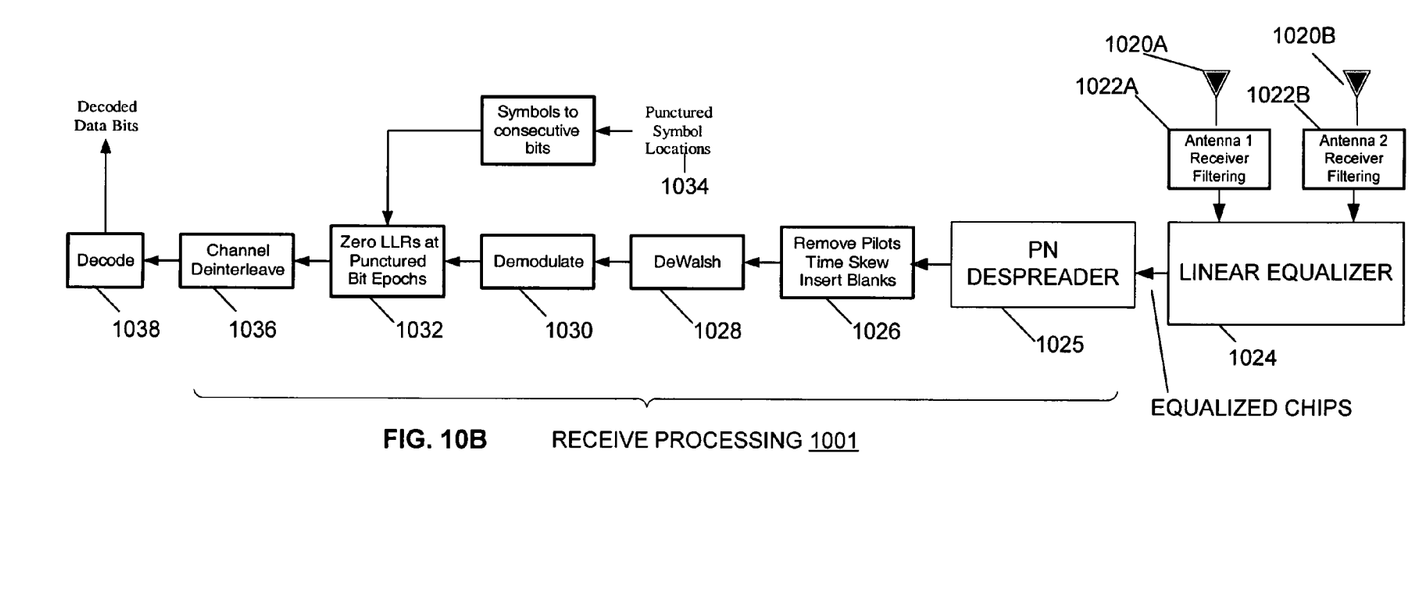
FIG. 10B illustrates an example of a forward link receive chain, process or structure, which may be implemented at an access terminal of FIG. 1.

FIG. 10B illustrates an example of a forward link receive chain, process or structure, which may be implemented at an access terminal 106 of FIG. 1. The functions and components shown in FIG. 10B may be implemented by software, hardware, or a combination of software and hardware. Other functions may be added to FIG. 10B in addition to or instead of the functions shown in FIG. 10B.

One or more antennas 1020A-1020B receive the forward link modulated signals from one or more base stations 104. Multiple antennas 1020A-1020B may provide spatial diversity against deleterious path effects such as fading. Each received signal is provided to a respective antenna receiver filtering block 1022, which conditions (e.g., filters, amplifies, downconverts) and digitizes the received signal to generate data samples for that received signal.

A cascaded adaptive linear equalizer 1024 receives data samples and generates equalized chips to block 1025. Block 1025 may despread the samples with one or more PN codes used in block 1014. Block 1026 may remove pilots time skew and insert blanks. In block 1028, a despreader may deWalsh, i.e., despread or remove Walsh codes from the received data samples, with the same spreading sequence used to spread the data in block 1010 at the base station.

In block 1030, a demodulator demodulates the data samples for all received signals to provide recovered symbols. For cdma2000, demodulation tries to recover a data transmission by (1) channelizing the despread samples to isolate or channelize the received data and pilot onto their respective code channels, and (2) coherently demodulating the channelized data with a recovered pilot to provide demodulated data. Demodulate block 1030 may implement a rake receiver to process multiple signal instances.

Block 1034 may receive punctured symbol locations and convert symbols to consecutive bits. Block 1032 may zero log likelihood ratios (LLRs) at punctured bit epochs. Block 1036 may apply a channel de-interleave.

In block 1038, a channel decoder decodes the demodulated data to recover decoded data bits transmitted by the base station 104.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium. A storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

APPENDIX A

| Cover (bits) | Num Forward Link Carriers (bits) | Bi-orthogonal Coding (binary symbols) | Codeword repetition | Walsh covering | Total chips |
|---|---|---|---|---|---|
| 4 [3 + 0(Pad)] | 4 | 16 | 4 | W(32, 24) | 2048 |

| Cover (bits) | Num Forward Carriers changed | Bi-orthogonal Coding (binary symbols) | Codeword repetition | Walsh covering | Total chips |
|---|---|---|---|---|---|
| 3 | 1 | 8 | 8 | W(32, 24) | 2048 |

| # of FL carriers | Rate (bits) | per-carrier Bi-orthogonal coding | Carrier codeword repetition | Walsh Covering | Codeword Repetition | Total chips |
|---|---|---|---|---|---|---|
| 1 | 4 | 8 | 0 | W(32, 8) | 8 | 2048 |
| 2 | 8 | 16 | 0 | W(32, 8) | 4 | 2048 |
| 3 | 12 | 24 | 1 | W(32, 8) | 2 | 2048 |
| 4 | 16 | 32 | 0 | W(32, 8) | 2 | 2048 |
| 5 | 20 | 40 | 3 | W(32, 8) | 1 | 2048 |
| 6 | 24 | 48 | 2 | W(32, 8) | 1 | 2048 |
| 7 | 28 | 56 | 1 | W(32, 8) | 1 | 2048 |
| 8 | 32 | 64 | 0 | W(32, 8) | 1 | 2048 |

What is claimed is:

1. A method comprising:
    assigning two or more forward link code division multiple access (CDMA) carriers operating in different frequency bands to transmit data from a base station to an access terminal;
    assigning one or more reverse link CDMA carriers operating in different frequency bands to transmit data from the access terminal to the base station; and
    limiting by the access terminal reverse link overhead transmissions associated with a selected number of forward link CDMA carriers by time-division multiplexing data rate control (DRC) information corresponding to the two or more forward link CDMA carriers and transmitting the time-division-multiplexed DRC information on one reverse link CDMA carrier to the base station.

2. The method of claim 1, wherein each forward link carrier is 1.25 MHz wide.

3. The method of claim 1, wherein limiting reverse link overhead transmissions comprises:
    transmitting data rate control (DRC) information and a DRC cover separately on one or more reverse link CDMA carriers to the base station, wherein the same DRC cover is transmitted for two or more forward link CDMA carriers.

4. The method of claim 3, wherein the DRC cover is not repeated with DRC information transmitted for each forward link CDMA carrier.

5. The method of claim 1, wherein limiting reverse link overhead transmissions comprises:
    time-division multiplexing acknowledgements (ACKs) and negative acknowledgements (NAKs) corresponding to the two or more forward link CDMA carriers; and
    transmitting the time-division-multiplexed ACKs and NAKs on one reverse link CDMA carrier to the base station.

6. The method of claim 5, wherein an ACK channel transmit time is ¼ slot.

7. The method of claim 1, wherein limiting reverse link overhead transmissions comprises:
    transmitting a channel of acknowledgements (ACKs) and negative acknowledgements (NAKs) with a time duration of half slot to one slot using in-phase and quadrature phase components of multiple Walsh codes.

8. The method of claim 1, wherein limiting reverse link overhead transmissions comprises:
    transmitting a single Data Source Channel (DSC) channel transmission on a single reverse link carrier from the access terminal to the base station.

9. The method of claim 1, further comprising soft-combining data received from the two or more forward link carriers.

10. The method of claim 9, further comprising:
    transmitting packets of data on individual forward link carriers at different times; and
    supporting soft handoff across forward link carriers with asynchronous transmissions.

11. The method of claim 1, further comprising increasing a number of medium access control (MAC) indices for forward link traffic.

12. The method of claim 1, further comprising using a plurality of medium access control (MAC) indices for preamble transmission to access terminals assigned with multiple forward link carriers.

13. A system comprising:
    a controller configured to:
        assign two or more forward link code division multiple access (CDMA) carriers operating in different frequency bands to transmit data from a base station to an access terminal; and
        assign one or more reverse link CDMA carriers operating in different frequency bands to transmit data from the access terminal to the base station; and
    the access terminal being configured to limit reverse link overhead transmissions associated with a selected number of forward link carriers by time-division multiplexing data rate control (DRC) information corresponding to the two or more forward link CDMA carriers and transmitting the time-division-multiplexed DRC information on one reverse link CDMA carrier to the base station.

14. The system of claim 13, wherein the controller is in the base station.

15. The system of claim 13, wherein the controller is in a base station controller.

16. The system of claim 13, wherein each forward link carrier is 1.25 MHz wide.

17. The system of claim 13, wherein the controller is further configured to transmit packets of data on individual forward link carriers at different times.

18. An access terminal comprising:
a receiver configured to receive data from a base station on two or more forward link code division multiple access (CDMA) carriers operating in different frequency bands;
a transmitter configured to transmit data on one or more reverse link CDMA carriers operating in different frequency bands to the base station; and
means to limit reverse link overhead transmissions associated with a selected number of forward link carriers by time-division multiplexing data rate control (DRC) information corresponding to the two or more forward link CDMA carriers and transmitting the time-division-multiplexed DRC information on one reverse link CDMA carrier to the base station.

19. The access terminal of claim 18, wherein means to limit reverse link overhead transmissions comprises:
means to transmit data rate control (DRC) information separate from a DRC cover on one or more reverse link CDMA carriers to the base station, wherein the DRC cover is not repeated with DRC information transmitted for each forward link CDMA carrier.

20. The access terminal of claim 18, wherein means to limit reverse link overhead transmissions comprises:
means to time-division multiplex acknowledgements (ACKs) and negative acknowledgements (NAKs) corresponding to the forward link CDMA carriers; and
means to transmit the time-division-multiplexed ACKs and NAKs on one reverse link CDMA carrier to the base station.

21. The access terminal of claim 20, wherein an ACK channel transmit time is ¼ slot.

22. The access terminal of claim 18, wherein means to limit reverse link overhead transmissions comprises:
means to transmit a channel of acknowledgements (ACKs) and negative acknowledgements (NAKs) with a time duration of 1 slot or ½ slot using a in-phases and quadrature phases of multiple Walsh codes.

23. The access terminal of claim 18, wherein means to limit reverse link overhead transmissions comprises:
means to transmit a single Data Source Channel (DSC) channel transmission on a single reverse link carrier from the access terminal to the base station.

24. The access terminal of claim 18, further comprising means to soft-combine data received from the two or more forward link carriers.

25. The access terminal of claim 18, further comprising means to support soft-handoff across forward link carriers with asynchronous transmissions.

26. An access terminal comprising:
a receiver configured to receive data from a base station on two or more forward link carriers operating in different frequency bands;
a transmitter configured to transmit data to the base station on one or more reverse link carriers operating in different frequency bands; and
a processor configured to limit reverse link overhead transmissions associated with a selected number of forward link carriers by time-division multiplexing data rate control (DRC) information corresponding to the two or more forward link CDMA carriers and transmitting the time-division-multiplexed DRC information on one reverse link CDMA carrier to the base station.

27. The access terminal of claim 26, wherein said processor is configured to transmit data rate control (DRC) information separate from a DRC cover on one or more reverse link carriers to the base station, wherein the DRC cover is not repeated with DRC information transmitted for each forward link carrier.

28. The access terminal of claim 26, wherein said processor is configured to:
time-division multiplex acknowledgements (ACKs) and negative acknowledgements (NAKs) corresponding to the forward link carriers; and
transmit the time-division-multiplexed ACKs and NAKs on one reverse link carrier to the base station.

29. The access terminal of claim 28, wherein an ACK channel transmit time is ¼ slot.

30. The access terminal of claim 26, wherein said processor is configured to transmit a channel of acknowledgements (ACKs) and negative acknowledgements (NAKs) with a time duration of 1 slot or ½ slot using a in-phases and quadrature phases of multiple Walsh codes.

31. The access terminal of claim 26, wherein said processor is configured to transmit a single Data Source Channel (DSC) channel transmission on a single reverse link carrier from the access terminal to the base station.

32. The access terminal of claim 26, wherein said processor is configured to soft-combine data received from the two or more forward link carriers.

33. The access terminal of claim 26, wherein said processor is configured to support soft-handoff across forward link carriers with asynchronous transmissions.

* * * * *